Patented July 11, 1939

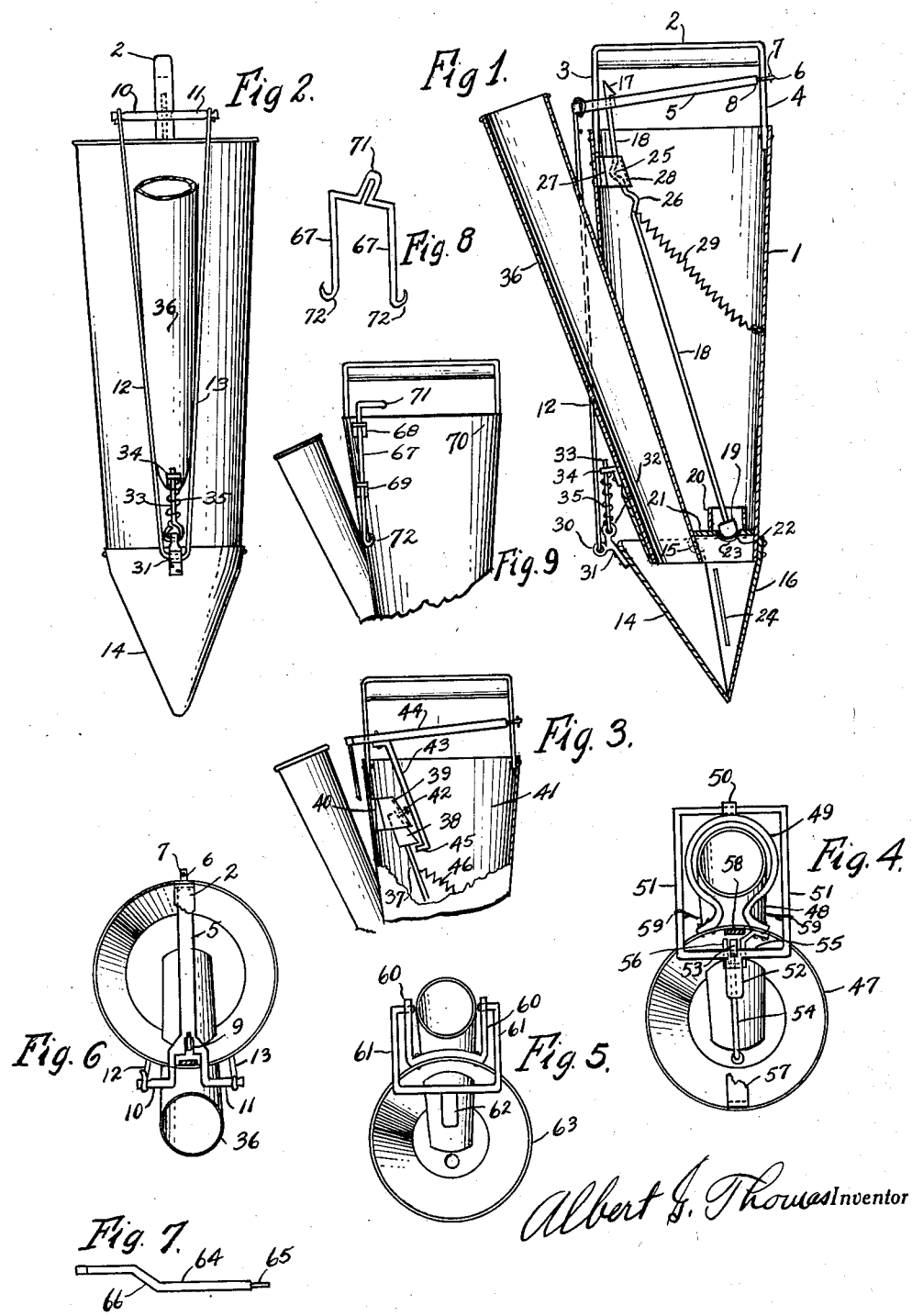

2,165,664

UNITED STATES PATENT OFFICE 2,165,664

PLANTING DEVICE

Albert G. Thomas, Lynchburg, Va., assignor to Sydnor-Thompson Mfg. Company, Inc., Lynchburg, Va.

Application February 28, 1938, Serial No. 193,022

3 Claims. (Cl. 111—4)

This invention relates to improvements in planting devices for setting tobacco, cabbage, tomatoes, and other plants, and is a continuation-in-part of my co-pending application Serial No. 188,597, filed February 4, 1938.

An object is to provide a planter of simple, cheap, and reliable construction.

Another object is the provision of a planter with valve operating mechanism so placed that it will not interfere with the hand.

Other objects will appear in the following description.

In the drawing:

Figure 1 is a part sectional side elevation of a planter with simplified valve operating mechanism.

Figure 2 is a front elevation, with plant tube partly broken away, of the device shown in Figure 1.

Figure 3 is a fragmentary side elevation, in part section, of a planter with simplified valve operating mechanism and with a valve adjustment.

Figure 4 is a plan view, with handle broken away, of a planter with a supporting stirrup around the plant tube.

Figure 5 is a plan view of a modified form of control lever and means for mounting it on a planter.

Figure 6 is a plan view, with handle broken away, of the device of Figure 1. The front support 3 is shown in section.

Figure 7 is a side elevation of a bent finger pull lever.

Figure 8 is a perspective view of a novel slidable finger pull rod.

Figure 9 is a side elevation of the pull rod of Figure 8 as adapted to a planter.

In Figure 1, water tank 1 has handle 2 attached by means of vertical supports 3 and 4. Bar 5 has reduced extension 6 passing loosely through a suitable hole in support 4. Pin 7 through extension 6, and shoulder 8 limit the lateral movement of bar 5 and so act as a pivot since loosely fitted extension 6 allows free vertical movement of the opposite end of bar 5. Bar 5, as shown in Fig. 6, has slot 9 and arms 10 and 11 to which are tied wires 12 and 13 for rotating conically shaped shovel 14 in clockwise direction about pivot 15 on fixed conically shaped shovel 16 which is riveted to tank 1.

Catch 17 is formed at the top of valve rod 18 which is fastened in suitable manner to rubber valve 19 which is surrounded by cylindrical valve guide 20 fastened to bottom 21 of tank 1. This bottom is provided with valve seat 22 having port 23 which is closed when valve 19 is properly seated. Water guide 24 is fastened to shovel 16 and serves to guide water from port 23 to the roots of the plant being set.

Fastened to the front wall of tank 1 is valve rod guide 27 which has a U shaped cross section and an inclined edge 28 as shown. Valve rod 18 has bent portion 25 which is slidable in U shaped guide 27 and serves to prevent rotation of valve rod 18 and consequently catch 17. An additional bent portion 26 in rod 18 acts as a cam so that when rod 18 is pulled upward by the edge of notch 9 lifting over-hanging catch 17 when bar 5 is lifted, cam 26 will then strike inclined edge 28 of guide 27, after rod 18 has been lifted a predetermined distance. Contact of cam 26 with edge 28 will then force rod 18 and catch 17 to the left so that catch 17 will drop off the edge of slot 9 and rod 18 will be quickly pulled downward by means of tension spring 29, fastened to rod 18 and tank 1, so that valve 19 will then close port 23, after this port has been previously opened for a time by lifting valve 18 as explained. Therefore the amount of water released through port 23 will be the same for each operation if the speed of lift of bar 5 is the same.

Wires 12 and 13, which may be one bent wire, are passed through eye 30 of lug 31 which is riveted or welded to shovel 14 as shown. Lug 31 also has eye 32 through which the lower end of rod 33 is looped to act as a pivot. Rod 33 passes through a suitable hole in guide lug 34 fastened to plant tube 36 which is fastened to tank 1. The lower end of tube 36 leads into the open space between shovels 14 and 16. Rod 33 is surrounded by compression spring 35 which presses against lug 34 and lug 31 to keep shovel 14 normally pressed against shovel 16.

In operation, tank 1 is nearly filled with water and a plant is dropped, roots down, into tube 36 so that the plant comes to rest in upright position between shovels 14 and 16. The cone formed by the shovels is then pressed into the ground the desired distance by a downward pressure of the hand on handle 2. Bar 5 is then grasped with the fingers and is pulled upward so that shovel 14 will be pulled outward away from shovel 16 and the plant will be dropped into the hole made by the shovels. At the same time catch 17 will be lifted a certain distance and then released, as described, so that valve 19 will be momentarily lifted to release a small quantity of water through port 23. This water will flow between guide 24 and shovel 16 to the roots of the plant. Then the shovels are lifted from the earth, being maintained in open position by squeezing bar 5 upward toward handle 2. After the jaws are lifted clear of the ground bar 5 is released so that the jaws are closed again by action of spring 35. Dirt may be then scraped around the root manually or by means of devices as described in my above mentioned co-pending patent application. The procedure is then repeated for the next plant to be set.

It will be noted that catch 17 is forced away from the hand so that it will not rub the fingers and cause discomfort in operating the device repeatedly. Similarly, guide 27 is placed sufficiently below handle 2 and bar 5 so that it will not interfere with the manual operations.

In Figure 3 the construction is essentially the same as in Figure 1, except that valve rod 37 has fastened to it cam 38 which strikes against the inclined edge 39 of U shaped guide 40 fastened to tank 41. Thumb screw 42 is threaded through edge 39 and serves as a contact element for cam 38, so that the time of opening of the valve, not shown, may be adjusted. Depending arm 43 is fastened to pivoted manually operated squeeze bar 44 and engages the lower edge of cam 38 to lift this cam and valve rod 37 when bar 44 is lifted. As cam 38 is lifted it is forced to the left until it finally drops off projection 45 so that spring 46 closes the valve. The time of opening of the valve may be lessened by shifting thumb screw 42 to the left and vice versa.

In Figure 4, water tank 47 has fastened to it plant tube 48 as usual. Surrounding tube 48 and suitably fastened to tank 47 is stirrup 49 to which is pivoted at 50 the rectangularly shaped looped finger lever 51 to which is fastened finger piece 52; or this finger piece may be integral with lever 51. Catch 53 fastened to valve rod 54 is lifted by the edge 55 of lever 51 when finger piece 52 is lifted. Guide 56 is similar to guide 27 and is fastened to tank 47. Handle 57 is shown broken away and the front handle support 58 is shown in section.

By this construction the leverage of pivot 50 may be extended as far as desired and stirrup 49 acts as a guard to prevent deformation of plant tube 48. Wires 59 for opening the pivoted shovel are attached to lever 51 as shown.

In Figure 5 lever 61, with finger piece 62, is pivoted to the legs of a U shaped element 60 which is fastened to water tank 63. This modified form of control lever is adapted to be used in place of lever 51 in Figure 4, and correspondingly connected to the shovel and valve operating mechanisms as in Figure 4.

Figure 7 shows a bar 64, with reduced portion 65, which may be used in place of bar 5. The slanting portion 66 serves to drop the rear part of the bar so that it will not interfere with grasping the front higher portion with the fore fingers.

In Figure 9 each rod portion 67 of the pull rod of Figure 8 is mounted in lugs 68 and 69 secured to the outside of water tank 70. The tops of the rod portions 67 are joined to a finger piece 71, so that the pull rod can be lifted; the lower ends of the rod portions being bent to form hooks 72. This pull rod is adapted to be used in place of control bar 5 in Figure 1; the horizontal portions joining the tops of elements 67 and finger piece 71 being adapted to engage catch 17 and the hooks 72 suitably connected to the shovel control wires 12—13.

Rod 67 may be bent to form a U shaped rod as shown in Figure 8. Then there would be a set of guide lugs for each leg and two hooks 72 would be provided as shown so that a double looped wire can be used to open the pivoted shovel. This is a very simple construction, employing sliding movement instead of pivoted movement.

Many changes of detail may be made without departing from the principles of my invention.

What I claim is:

1. In a planting device, a tank for liquid, a shovel fixed to the lower part of said device, a movable shovel pivoted to said fixed shovel, a plant tube fastened to said tank and leading into the space between said shovels, yielding means normally urging said movable shovel toward said fixed shovel, a handle attached to said tank, a valve in the bottom of said tank, a valve rod attached to said valve, a portion of said valve rod being inclined relative to the rest of said rod to act as a cam portion and the upper portion of said rod terminating in a catch, a movable element adjacent said handle and linked to said movable shovel and coacting with said catch when said element is manually moved relative to said handle, a guide for said valve rod, said guide being fastened to said tank and having an inclined surface against which said cam portion on said valve rod will strike to move said rod and catch laterally so that said catch will be disengaged from contact with said movable element and so as to allow said valve rod to drop to close said valve after said valve rod and valve have been lifted a pre-determined distance by means of said element.

2. In a planting device, a tank for liquid, a shovel fixed to the lower part of said device, a movable shovel pivoted to said fixed shovel, a plant tube fastened to said tank and leading into the space between said shovels, yielding means normally urging said movable shovel toward said fixed shovel, a handle attached to said tank, a valve in the bottom of said tank, a valve rod attached to said valve, a spring normally urging said valve rod in a direction to close said valve, a portion of said valve rod being inclined relative to the rest of said rod to act as a cam portion and the upper portion of said rod terminating in a catch, a movable element adjacent said handle and linked to said movable shovel and coacting with said catch when said element is manually moved relative to said handle, a guide for said valve rod, said guide being fastened to said tank and having an inclined surface against which said cam portion on said valve rod will strike to move said rod and catch laterally so that said catch will be disengaged from contact with said movable element and so to allow said valve rod to be moved by said spring to close said valve after said valve rod and valve have been lifted a pre-determined distance by means of said element.

3. In a planting device, a tank for liquid, a shovel fixed to the lower part of said device, a movable shovel pivoted to said fixed shovel, a plant tube fastened to said tank and leading into the space between said shovels, yielding means normally urging said movable shovel toward said fixed shovel, a handle attached to said tank, a manually movable element linked to said movable shovel and adjacent said handle, a valve in the bottom of said tank, a valve rod attached to said valve, a spring normally urging said valve rod in a direction to close said valve, a guide for said valve rod, said guide being fastened to said tank, a portion of said valve rod being kinked to slide in said guide to prevent rotation of said rod, the upper portion of said rod terminating in a catch, another portion of said rod being kinked to act as a cam portion to strike against said guide and so to move said catch laterally to be disengaged from contact with said movable element and so to allow said valve rod to be moved by said spring to close said valve after said valve rod and valve have been lifted a predetermined distance by means of said element.

ALBERT G. THOMAS.